US010136371B2

(12) United States Patent
Siomina et al.

(10) Patent No.: US 10,136,371 B2
(45) Date of Patent: Nov. 20, 2018

(54) RAT SELECTION FOR DEVICES CAPABLE OF DEVICE-TO-DEVICE (D2D) COMMUNICATION

(71) Applicant: Telefonaktiebolaget L M Ericsson (publ), Stockholm (SE)

(72) Inventors: Iana Siomina, Solna (SE); Fredrik Gunnarsson, Linköping (SE); Bengt Lindoff, Bjärred (SE); Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 205 days.

(21) Appl. No.: 14/600,646

(22) Filed: Jan. 20, 2015

(65) Prior Publication Data

US 2015/0215833 A1  Jul. 30, 2015

Related U.S. Application Data

(60) Provisional application No. 61/931,042, filed on Jan. 24, 2014.

(51) Int. Cl.
*H04W 36/08* (2009.01)
*H04W 76/14* (2018.01)
(Continued)

(52) U.S. Cl.
CPC ............ *H04W 36/08* (2013.01); *H04W 48/16* (2013.01); *H04W 72/0453* (2013.01);
(Continued)

(58) Field of Classification Search
CPC ....... H04W 4/008; H04W 4/027; H04W 8/02; H04W 24/02; H04W 36/08;
(Continued)

(56) References Cited

U.S. PATENT DOCUMENTS

2013/0157676 A1  6/2013 Baek et al.
2015/0043448 A1*  2/2015 Chatterjee ............. H04W 8/005
370/329

(Continued)

FOREIGN PATENT DOCUMENTS

WO         0122755 A1   3/2001
WO      2013002688 A1   1/2013
WO   WO 2013055271 A1 * 4/2013 ............ H04W 36/08

OTHER PUBLICATIONS

Fodor, Gábor et al., "Design Aspects of Network Assisted Device-to-Device Communications," IEEE Communications Magazine, vol. 50, Issue 3, Mar. 2012, IEEE, p. 170-177.

(Continued)

*Primary Examiner* — George Eng
*Assistant Examiner* — Hung Du
(74) *Attorney, Agent, or Firm* — Patent Portfolio Builders, PLLC

(57) ABSTRACT

Systems and methods for Radio Access Technology (RAT) selection for devices capable of Device-to-Device (D2D) communication are disclosed. In some embodiments, a method of operation of a wireless device in a cellular communications network is provided. The method includes camping on a first cell on a first carrier, where the first cell does not support D2D communication. The method also includes, during a first time interval when the first cell satisfies one or more criteria for the wireless device to remain camped on the first cell, monitoring at least one second carrier on a set of pre-configured radio resources for at least one of the group consisting of: a second cell that supports D2D communication, a signal from a second wireless device that supports D2D communication, and D2D communication.

1 Claim, 12 Drawing Sheets

(51) Int. Cl.
*H04W 72/04* (2009.01)
*H04W 48/16* (2009.01)
*H04W 88/06* (2009.01)
*H04W 48/20* (2009.01)

(52) U.S. Cl.
CPC ........... *H04W 76/14* (2018.02); *H04W 88/06* (2013.01); *H04W 48/20* (2013.01)

(58) Field of Classification Search
CPC . H04W 72/1278; H04W 72/08; H04W 72/10; H04W 76/14; H04W 76/0453; H04W 88/06; H04W 48/16; H04W 48/20
See application file for complete search history.

(56) References Cited

U.S. PATENT DOCUMENTS

2015/0208332 A1* 7/2015 Baghel .................. H04W 48/16
370/255
2015/0245193 A1* 8/2015 Xiong .................. H04W 76/023
370/328

OTHER PUBLICATIONS

International Search Report and Written Opinion for International Patent Application No. PCT/IB2015/050504, dated Jun. 18, 2015, 11 pages.
Author Unknown, "Technical Specification Group Services and Systems Aspects; Feasibility study for Proximity Services (ProSe) (Release 12)," Technical Report 22.803, Version 12.2.0, 3GPP Organizational Partners, Jun. 2013, 45 pages.

* cited by examiner

RAT SELECTION FOR DEVICES CAPABLE OF DEVICE-TO-DEVICE (D2D) COMMUNICATION

RELATED APPLICATIONS

This application claims the benefit of provisional patent application Ser. No. 61/931,042, filed Jan. 24, 2014, the disclosure of which is hereby incorporated herein by reference in its entirety.

FIELD OF THE DISCLOSURE

The present disclosure relates to Radio Access Technology (RAT) selection in a cellular communications network.

BACKGROUND

Device-to-Device (D2D) communication as a means of relaying in cellular networks was proposed by some early works on ad hoc networks, but the concept of allowing local D2D communication to use cellular spectrum resources simultaneously with ongoing cellular traffic is relatively new. The non-orthogonal resource sharing between the cellular network and the D2D layers has the potential of reuse gain and proximity gain while at the same time increasing the resource utilization. Because of this, D2D communication underlying cellular networks has received considerable interest in the recent years.

Specifically, in $3^{rd}$ Generation Partnership Program (3GPP) Long Term Evolution (LTE) networks, such as LTE Direct, D2D communication can be used in commercial applications, such as cellular network offloading, proximity based social networking, or in public safety situations in which first responders need to communicate with each other and with people in the disaster area. For more details, the interested reader is directed to 3GPP Technical Report (TR) 22.803. This has led to plans to standardize User Equipment (UE) capability in LTE for supporting D2D communication, especially in the National Security Public Safety (NSPS) network.

D2D communication entities using a LTE Direct link may reuse the same Physical Resource Blocks (PRB) as used for cellular communications either in the downlink, in the uplink, or both. The PRB refer to the time and/or frequency resources to be used. The reuse of radio resources in a controlled fashion can lead to the increase of spectral efficiency, but at the expense of some increase of the intra-cell interference. In many implementations, D2D communicating entities use uplink resources such as uplink PRBs but it is possible that D2D communications take place in the cellular downlink spectrum in a Frequency Division Duplexing (FDD) system or in downlink time slots in a cellular Time Division Duplexing (TDD) system. The term D2D communication comprises, but is not limited to, transmission and/or reception of signals such as synchronization signals, discovery signals, reference signals, broadcast information, control information, payload data, etc.

When a device, such as a User Equipment (UE), is turned on, it starts to look for a "good enough" Radio Access Technology (RAT) to camp on. As used herein, camping means that the device has completed the cell selection/reselection process and has chosen a cell. The device monitors system information and (in most cases) paging information. The device might monitor several frequency bands and carrier frequencies in order to find a suitable cell. Once a suitable cell is detected (typically strong enough to be able to read broadcast information, and the device is allowed to camp on that cell), the device registers to the network and starts monitoring the carrier for paging messages from the camping cell. In case the strongest detected cell on one carrier is worse than a threshold, the device enables Inter-RAT (IRAT) measurements (searching for cells on other carriers that may support a different RAT), and does reselection to another detected RAT, if that carrier/RAT is "good enough." The device only does IRAT measurements when necessary, and the search is only performed on radio signals transmitted by base stations in downlink resources (frequency/time).

When a device finds a suitable cell to camp on, the device may not detect D2D communications that are available. Therefore, there is a need for improved use of D2D communications.

SUMMARY

Systems and methods for Radio Access Technology (RAT) selection for devices capable of Device-to-Device (D2D) communication are disclosed. In some embodiments, a method of operation of a wireless device in a cellular communications network is provided. The method includes camping on a first cell on a first carrier, where the first cell does not support D2D communication. The method also includes, during a first time interval when the first cell satisfies one or more criteria for the wireless device to remain camped on the first cell, monitoring at least one second carrier on a set of pre-configured radio resources for at least one of the group consisting of: a second cell that supports D2D communication, a signal from a second wireless device that supports D2D communication, and D2D communication.

In some embodiments, monitoring the at least one second carrier includes monitoring at least one second carrier on a set of pre-configured radio resources for a second cell that supports D2D communication. The method also includes determining whether a second cell that supports D2D communication is detected on the at least one second carrier based on the monitoring of the at least one second carrier; and if a second cell that supports D2D communication is detected on the at least one second carrier, camping on the second cell. In some embodiments, determining whether the second cell that supports D2D communication is detected further comprises determining whether the wireless device supports D2D communication on the at least one second carrier.

In some embodiments, monitoring the at least one second carrier includes monitoring at least one second carrier on a set of pre-configured radio resources for a signal from a second wireless device that supports D2D communication. The method also includes determining whether a signal from a second wireless device that supports D2D communication is detected on the at least one second carrier based on the monitoring of the at least one second carrier; and if the signal from a second wireless device that supports D2D communication is detected on one of the at least one second carrier that supports D2D communication, camping on the one of the at least one second carrier.

In some embodiments, monitoring the at least one second carrier includes monitoring at least one second carrier on a set of pre-configured radio resources for D2D communication. The method also includes determining whether D2D communication is detected on the at least one second carrier based on the monitoring of the at least one second carrier. The method also includes, if D2D communication is detected on one of the at least one second carrier that supports D2D communication, remaining camped on the first cell on the first carrier and monitoring the at least one second carrier on the set of pre-configured radio resources for D2D communication.

In some embodiments, the method also includes determining whether radio resources on which the D2D communication is detected overlap with radio resources utilized for paging occasions on the first carrier.

In some embodiments, the method also includes monitoring both the first carrier and one or more of the at least one second carrier on which the D2D communication is detected if the radio resources on which the D2D communication is detected do not overlap with the radio resources utilized for paging occasions on the first carrier.

In some embodiments, the method also includes, if the radio resources on which the D2D communication is detected do overlap with the radio resources utilized for paging occasions on the first carrier, determining priorities for monitoring both the first carrier and one or more of the at least one second carrier on which the D2D communication is detected and monitoring at least one of the first carrier and the one or more of the at least one second carrier according to the priorities.

In some embodiments, determining the priorities for monitoring includes determining to prioritize monitoring of the one or more of the at least one second carrier on which the D2D communication is detected.

In some embodiments, determining the priorities for monitoring includes determining to prioritize monitoring of the radio resources utilized for paging occasions on the first carrier.

In some embodiments, determining the priorities for monitoring includes prioritizing monitoring of the one or more of the at least one second carrier on which the D2D communication is detected if a priority value for D2D communication is greater than a threshold value and prioritizing monitoring of the radio resources utilized for paging occasions on the first carrier if the priority value for D2D communication is not greater than the threshold value.

In some embodiments, the pre-configured radio resources are received from the first cell. In some embodiments, the pre-configured radio resources are stored on the wireless device.

In some embodiments, the first time interval is chosen from a group consisting of: a portion of a non-paging occasion of the first cell and an entire non-paging occasion of the first cell minus a predefined synchronization time.

In some embodiments, monitoring the at least one second carrier on a set of pre-configured radio resources further includes successfully synchronizing to the at least one second carrier.

In some embodiments, monitoring the at least one second carrier on a set of pre-configured radio resources also includes successfully reading system information on the at least one second carrier. In some embodiments, the system information is chosen from a group consisting of a Master Information Block and a System Information Block.

In some embodiments, monitoring the at least one second carrier on a set of pre-configured radio resources also includes monitoring for a random access response on the at least one second carrier.

In some embodiments, the set of pre-configured radio resources includes resources chosen from at least one of a group consisting of resources allocated for D2D synchronization signals, resources allocated for D2D beacon signals, and resources allocated for D2D broadcast transmissions.

In some embodiments, the cellular communications network is a Long Term Evolution (LTE) communications network. In some embodiments, the at least one second carrier is an LTE Direct carrier, and the first carrier is a non-LTE Direct carrier.

In some embodiments, the at least one second carrier is a National Security Public Safety (NSPS) carrier, and the first carrier is a non-NSPS carrier.

In some embodiments, a wireless device in a cellular communications network is provided. The wireless device includes a wireless transceiver; at least one processor; and memory containing software executable by the at least one processor whereby the wireless device is operative to camp on a first cell on a first carrier where the first cell does not support D2D communication and, during a first time interval when the first cell satisfies one or more criteria for the wireless device to remain camped on the first cell, monitor at least one second carrier on a set of pre-configured radio resources for at least one of a group consisting of: a second cell that supports D2D communication, a signal from a second wireless device that supports D2D communication, and D2D communication.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods for Radio Access Technology (RAT) selection for devices capable of Device-to-Device (D2D) communication are disclosed. In some embodiments, a method of operation of a wireless device in a cellular communications network is provided. The method includes camping on a first cell on a first carrier, where the first cell does not support D2D communication. The method also includes, during a first time interval when the first cell satisfies one or more criteria for the wireless device to remain camped on the first cell, monitoring at least one second carrier on a set of pre-configured radio resources for at least one of a group consisting of: a second cell that supports D2D communication, a signal from a second wireless device that supports D2D communication, and D2D communication.

In the description below, the word device, wireless device or User Equipment device (UE) may be used, but the present disclosure also covers smart phones, sensors, tablets, Machine-Type Communication (MTC) type devices, etc. Furthermore, the present disclosure is described assuming a Long Term Evolution (LTE) cellular system and a LTE National Security Public Safety (NSPS) carrier. However, the present disclosure is not limited thereto, but is also applicable to other present and future standards where cellular communication and D2D communication is possible within the same RAT.

In the description below, examples are given for two different carriers, an NSPS carrier capable to support D2D (direct communication with another device without communicating via a central node) service, both inside cellular coverage (i.e., network assisted D2D) as well as outside network coverage, and a non-NSPS carrier which does not support D2D communication. An example for a non-NSPS carrier is a standard LTE Release 11 carrier/cellular system. Hence, the term NSPS should not be seen as limiting, but instead be seen as a cellular carrier supporting D2D communication both inside and outside network coverage. For example, in a network such as LTE Direct, D2D communication can be used in commercial applications, such as cellular network offloading, proximity based social networking, etc.

Figure 1:
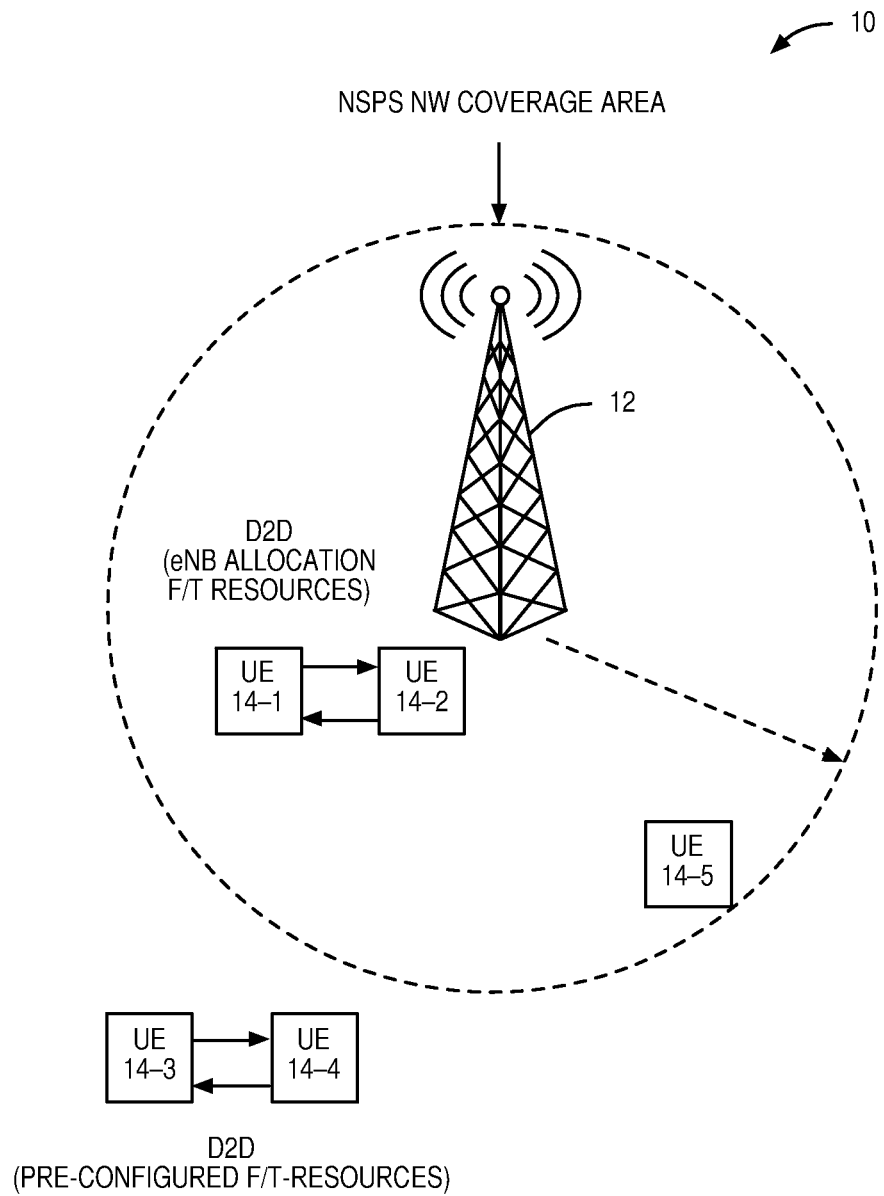
FIG. 1 illustrates the principles for Device-to-Device (D2D) communication within a cellular communications network.

FIG. 1 shows an exemplary cellular communications network 10, according to some embodiments. Cellular communications network 10 includes a network node 12 which supports a NSPS network. In this embodiment, network node 12 is an evolved Node B (eNB) but may be some other controlling node such as a cluster head of a D2D mesh network, for example. A NSPS network is designed to provide communication resources for national security and public safety personnel. In some situations, a network node such as network node 12 may provide a NSPS network coverage area to enable communication for a User Equipment (UE) 14 (referred to herein as UE 14 and UEs 14). Note that UEs 14 may more generally be referred to herein as wireless devices.

As shown in FIG. 1, in a first scenario, the UE 14-1 and the UE 14-2 are communicating directly via a D2D link. Both the UE 14-1 and the UE 14-2 are inside the network coverage area of network node 12. In this scenario, network node 12 allocates the radio frequency/time resources for the UE 14-1 and the UE 14-2 to use for D2D communication. This is sometimes referred to as network assisted D2D communication. In a second scenario, the UE 14-3 and the UE 14-4 may have D2D communication out of reach of network node 12, i.e. out of coverage. In this scenario, UE 14-3 and the UE 14-4 communicate using pre-configured frequency/time resources for D2D communication. The pre-configured frequency/time resources may be determined by standard or by device capabilities for instance. FIG. 1 also shows the UE 14-5 which is inside the network coverage area of network node 12 but not within range of another UE for D2D communication. While D2D communication is discussed herein in relation to an NSPS network, the present is not limited thereto.

Figure 2:
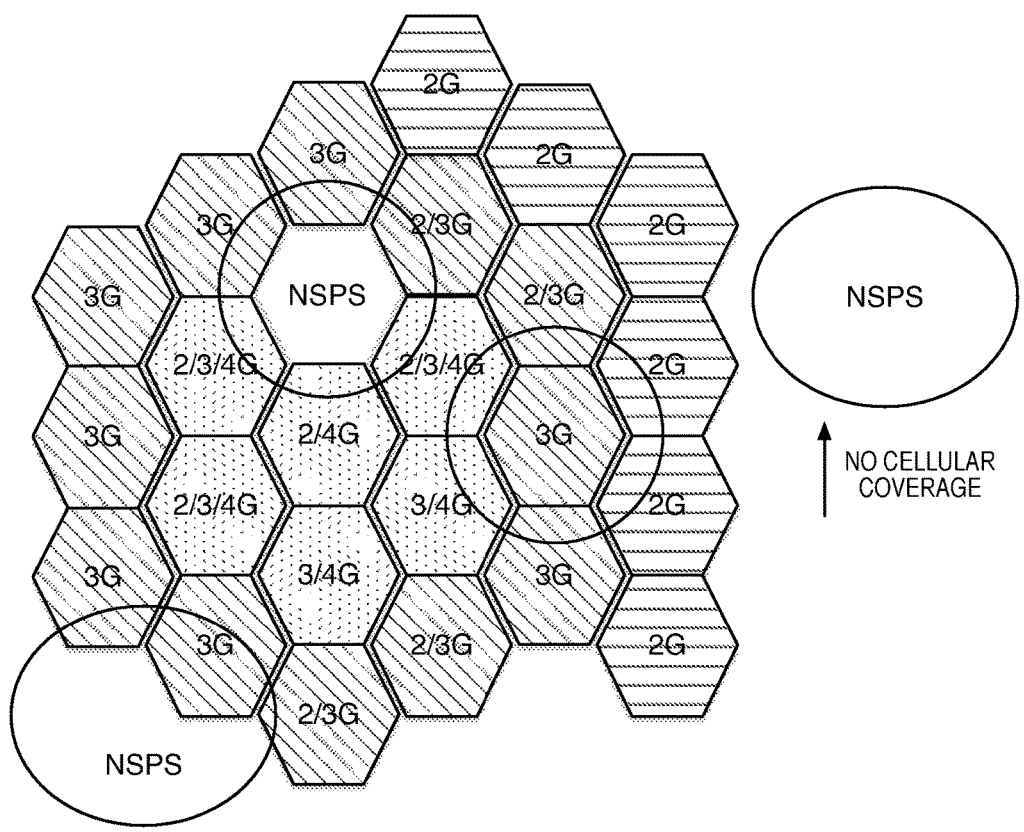
FIG. 2 illustrates an example of how a cellular system covers a certain area.

FIG. 2 illustrates an example of how a cellular system covers a certain area. In some areas, a $4^{th}$ Generation (4G) (such as LTE) network is deployed on a first set of carriers. In some other regions (rural areas, for example), only $2^{nd}$ Generation (2G) or $3^{rd}$ Generation (3G) RATs are deployed (typically on a second set of carriers). As can be noted, there could be several RATs deployed in the same area. 2G or 3G services are typically established in an area before 4G services are established. Hence, in a typical scenario, if 4G service is present, at least one of 2G or 3G service is often present as well. In some areas, there may be no cellular coverage at all. NSPS cellular services, as discussed above, may be deployed on a third set of carriers. NSPS cellular services might only be deployed in small specific areas such as in the beginning of a roll out of an NSPS deployment or if there is a need for emergency services over a longer time (for disasters, etc.). Outside such NSPS cellular areas, in order for a device to participate in NSPS communication, the device needs to rely on D2D communication using the NSPS carrier.

Since NSPS cellular coverage may be sparse, NSPS devices may typically also have standard 2G/3G/4G communication capability as well. Hence, NSPS devices may select ordinary RATs to camp on in case they are outside an NSPS network coverage area. The systems and methods disclosed herein are agnostic to the actual RATs used or available and may also be used with $5^{th}$ Generation (5G) RATs or any other RATs developed in the future.

As discussed above, when a UE 14 is turned on, it starts to look for a "good enough" RAT to camp on. Whether a RAT is "good enough" may be based on some quality metric such as Reference Signal Receive Power (RSRP), Received Signal Strength Indicator (RSSI), Signal-to-Interference-and-Noise Ratio (SINR), or Reference Signal Received Quality (RSRQ). As used herein, camping means that the UE 14 has completed the cell selection/reselection process and has chosen a cell. The UE 14 monitors system information and (in most cases) paging information. The UE 14 might monitor several frequency bands and carrier frequencies in order to find a suitable cell. Once a suitable cell is detected (typically strong enough to be able to read broadcast information, and the device is allowed to camp on that cell), the device registers to the network and starts monitoring the carrier for paging messages from the camping cell. In case the strongest detected cell on one carrier is worse than a threshold, the device enables Inter-RAT (IRAT) measurements (searching for cells on other carriers that may support a different RAT). The UE 14 does reselection to another detected RAT if that carrier/RAT is "good enough." The UE 14 only does IRAT measurements when necessary, and the search is only performed on radio signals transmitted by base stations in downlink resources (frequency/time).

When the UE 14 finds a suitable cell to camp on, the UE 14 may not detect D2D communications that are available.

This may be because the D2D communications are on a different RAT or carrier that the UE 14 will not monitor because the UE 14 is camping on a suitable cell. Also, the UE 14 may miss D2D communications that are taking place in uplink resources (frequency/time) that are not being monitored by normal camping procedures or by standard IRAT measurements that only investigate downlink resources. Therefore, there is a need for improved use of D2D communications.

Specifically, a UE 14 supporting NSPS and only following prior art cell reselection principles may cause at least the following problem:
  in case of no NSPS coverage, the UE 14 will try to camp on a non-NSPS RAT (i.e., a standard cellular RAT) as long as such RAT is detected to be "good enough." Then the UE 14 will miss possible D2D broadcast (or unicast or groupcast) transmissions on the NSPS carrier; and
  prior art IRAT measurement and cell search principles are only defined for downlink resources/carriers, while D2D often takes place in uplink resources/uplink carriers. Hence, prior art techniques do not disclose methods for IRAT monitoring of D2D transmission.

No idle mode RAT selection approach exists which takes into account the existing D2D possibilities in case of no network coverage for NSPS services. In some embodiments, the methods and apparatus disclosed here can be used to solve that problem.

Figure 3:
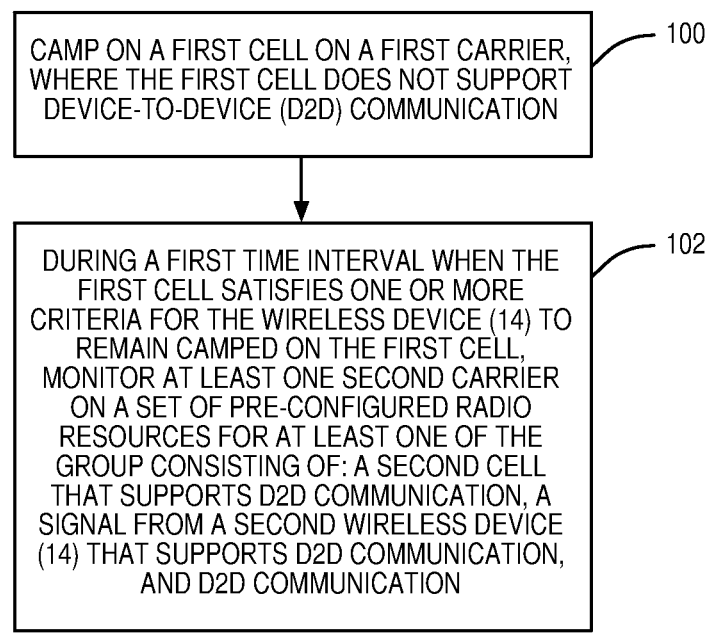
FIG. 3 illustrates a method of operating a wireless device, according to some embodiments of the present disclosure.

FIG. 3 illustrates a method of operating a wireless device such as the UE 14, according to some embodiments of the present disclosure. The UE 14 camps on a first cell on a first carrier. The first cell does not support D2D communication (step 100). In some embodiments, the first cell on the first carrier is a non-NSPS cell such that if the UE 14 needs to make use of NSPS services, they are unavailable on the first cell.

During a first time interval when the first cell satisfies one or more criteria for the UE 14 to remain camped on the first cell, the UE 14 monitors at least one second carrier on a set of pre-configured radio resources (step 102). The UE 14 monitors the at least one second carrier for a second cell that supports D2D communication, a signal from a second the UE 14 that supports D2D communication, or D2D communication. In some embodiments, the one or more criteria for the UE 14 to remain camped on the first cell include the criteria for determining that the first cell is a suitable cell and possibly determining that IRAT measurements are unnecessary. Determining that the first cell is a suitable cell may be based on some quality metric such as RSRP, RSSI, SINR, or RSRQ. In some embodiments, the set of pre-configured radio resources may be stored on the UE 14, perhaps on the Subscriber Identity Module (SIM) card or in some other storage. In some embodiments, the set of pre-configured radio resources may be received from the first cell, perhaps in response to the UE 14 notifying the first cell that the UE 14 has NSPS capabilities.

Hence, compared to the prior art, the UE 14 should always monitor at least one second carrier on a set of pre-configured radio resources even though the non-NSPS RAT is "good enough" and the UE 14 has determined there is no network coverage on the NSPS carrier.

Figure 4:
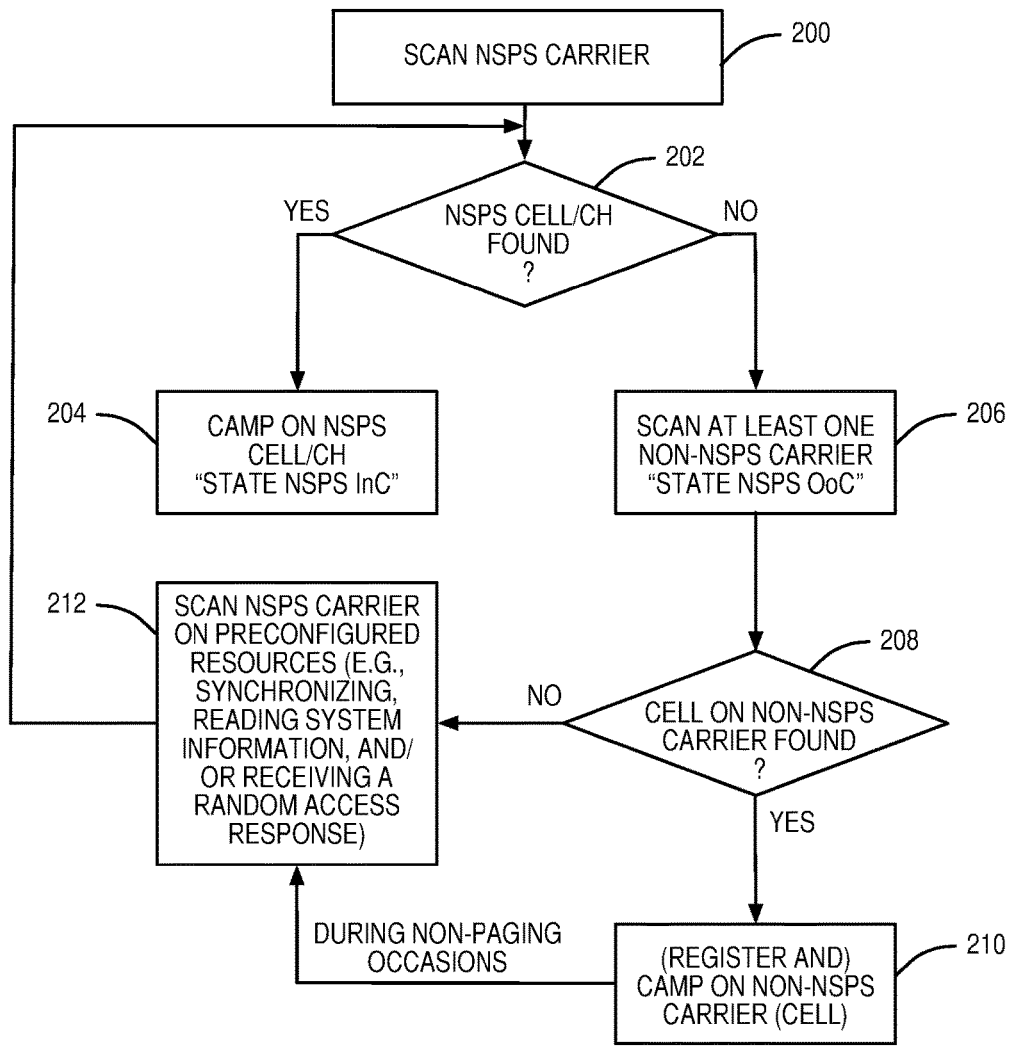
FIG. 4 illustrates another method of operating a wireless device, according to some embodiments of the present disclosure.

FIG. 4 illustrates another method of operating a UE 14, according to some embodiments of the present disclosure. In a case where the UE 14 is inside NSPS carrier coverage, it is possible for the UE 14 to camp on an NSPS cell. Moreover, it is possible that a different node, such as a Cluster Head (CH), is capable of supporting registration of the UE 14 (similar to legacy cellular registration and camping) in case there are no NSPS cells. Furthermore, the UE 14 itself may support internal registration at higher layers to an internal entity in a similar fashion as when the registration procedure is towards an external entity. This means that the UE 14 can be in a registered state from the UE perspective also when it is outside network coverage.

In FIG. 4, the UE 14 starts monitoring an NSPS carrier for cells or CHs (step 200). In some embodiments, the monitoring typically involves cell search and, if synchronization channels are detected (e.g., Primary Synchronization Signal (PSS)/Secondary Synchronization Signal (SSS)), broadcast information (Master Information Block (MIB)/System Information Block (SIB)) may be tried to be detected. In other embodiments a CH may transmit its synchronization signal on an uplink carrier (e.g., uplink resources). In that case, the UE 14 may also search for CH synch signals on an uplink carrier associated with the NSPS downlink carrier. The UE 14 determines whether an NSPS cell or CH has been detected on the carrier (step 202).

In some embodiments, detection of an NSPS cell or a CH is made by successful reception of a random access response, while in other embodiments successful PSS/SSS detection or MIB/SIB read is sufficient (or signal level above a threshold indicating MIB/SIB reception is possible). In case an NSPS cell (or CH) is detected, the UE 14 is in the state "NSPS In coverage," and the UE 14 camps on that cell or CH (step 204). In case an NSPS cell has been detected at two or more NSPS carriers, and the UE 14 is capable of supporting D2D communication in a subset of these carriers, the UE 14 camps on an NSPS cell from the subset of these carriers. In case no NSPS cell (or CH) is detected, the UE 14 is in state "NSPS out-of coverage," and the UE 14 then monitors at least one non-NSPS carrier for cells (step 206). The non-NSPS carrier may be of any RAT, for instance LTE, Wideband Code Division Multiple Access (WCDMA)/High Speed Packet Access (HSPA), Global System for Mobile Communications (GSM)/Enhanced Data Rates for Global Evolution (EDGE) or Wireless Local Area Network (WLAN). Other RATs may also be possible. The carrier frequencies to monitor may be determined from historical information (e.g., a history list of earlier used carrier frequencies and RATs) or based on stored information on the SIM card (or in the device memory).

The UE 14 then determines if a cell on a non-NSPS carrier is found (step 208). If a cell on a non-NSPS carrier has been detected, the UE 14 may register to that cell and camp on the cell (e.g., the UE 14 may start monitoring a paging message transmitted at regular intervals) (step 210). Optionally, the UE 14 can register as an NSPS UE at the non-NSPS cell, if supported, to inform the non-NSPS cell about the NSPS capabilities of the UE 14. Potentially, this could have an impact on how the UE 14 is handled in idle mode by the non-NSPS carrier cell.

After camping on the non-NSPS cell, during non-paging occasions on the non-NSPS cell, the UE 14 may monitor a NSPS carrier on preconfigured resources (step 212). This may occur during at least a first time period outside paging occasions and possibly also outside a time instant needed for the UE 14 to synchronize to the non-NSPS carrier prior to the reception of the paging message (perhaps 5-10 milliseconds (ms) prior to paging). The UE 14 may monitor the NSPS carrier for D2D beacon signals/D2D broadcast messages or D2D synchronization signals on pre-configured resources.

If the UE 14 was able to inform the non-NSPS cell about its NSPS capabilities, then perhaps the non-NSPS cell will provide a different set of paging occasions compared to non-NSPS UEs. The paging occasions may be designed such that the UE 14 may, over a larger cycle (larger than the Paging Discontinuous Reception (DRX) cycle), be able to monitor the pre-configured D2D resources on the NSPS carrier for all time offsets. One such design may be to introduce jitter in the DRX cycle for NSPS-capable UEs 14 (example: DRX=2.56+D sec, where D is a jitter time sequence (pseudo) randomly shifting±20 ms, for example).

In case no non-NSPS carrier is detected in step 208 (possible after monitoring multiple frequency bands and RATs), the UE 14 proceeds to step 212 and monitors the NSPS carrier on preconfigured resources as discussed above. The UE 14 then proceeds to step 202 to determine if an NSPS cell (or CH) was found and repeats the cycle as necessary. Note that in some embodiments, the UE 14 will be able to camp on an NSPS cell (or CH) when the UE 14 would not have been able to using prior art techniques. At least some embodiments disclosed herein solve the problem with cell reselection and D2D monitoring between non-NSPS and NSPS carriers. Hence, NSPS devices may monitor for D2D communication on an NSPS carrier while camping on a non-NSPS RAT.

While in FIG. 4, camping on an NSPS cell is possible, in some embodiments, camping/registration on an NSPS cell (or CH) is not possible. This may be because the UE 14 is outside NSPS carrier cell coverage. In this case, the UE 14 may then camp on a non-NSPS carrier and still monitor pre-configured synchronization resources on the NSPS carrier frequency during a first time period outside paging occasions on the camping non-NSPS RAT. Once synch resources are detected, the UE 14 may continue to monitor pre-configured resources for beacon signals or broadcast communication.

When a D2D broadcast has been detected, the UE can determine the D2D broadcast resources. If these resources are non-overlapping with the non-NSPS carrier paging occasions, then the UE 14 may continue to monitor both the D2D broadcast resources and the non-NSPS carrier paging occasions. However, if they are partly or completely overlapping, then the UE 14 may prioritize monitoring as discussed in more detail below.

Figure 5A:
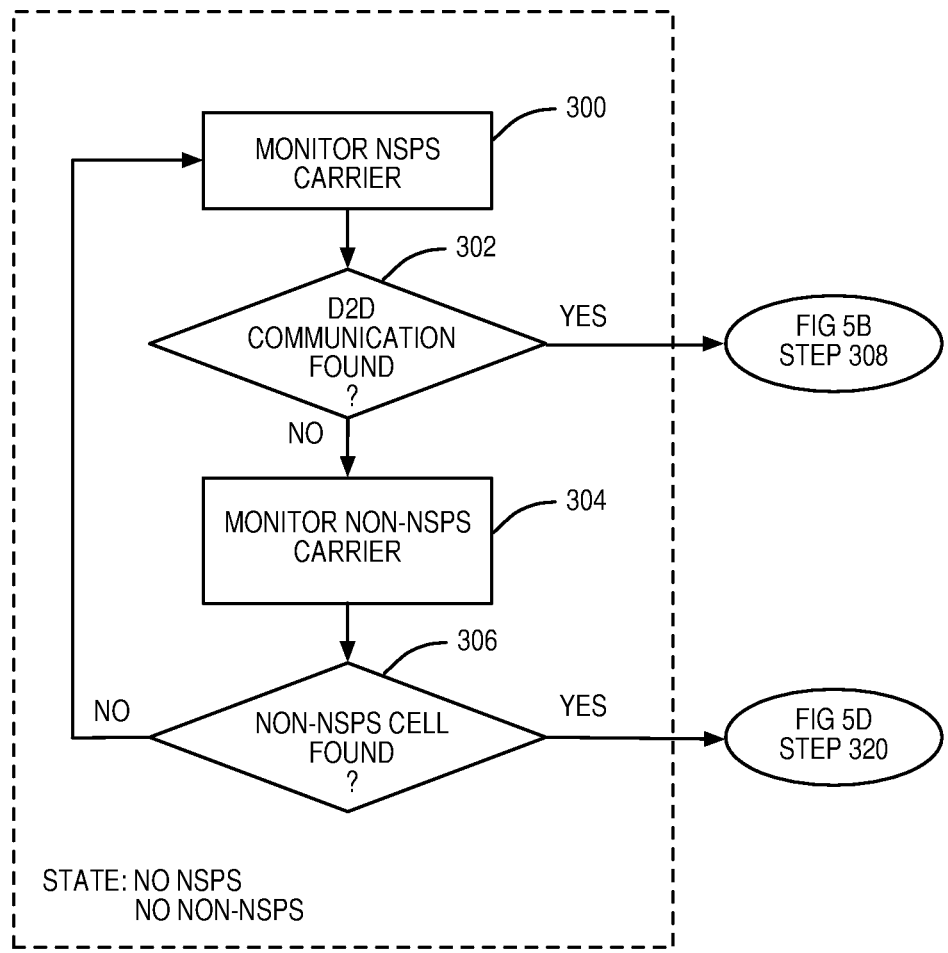
FIGS. 5A-5D illustrate another method of operating a wireless device, according to some embodiments of the present disclosure.
Figure 5B:
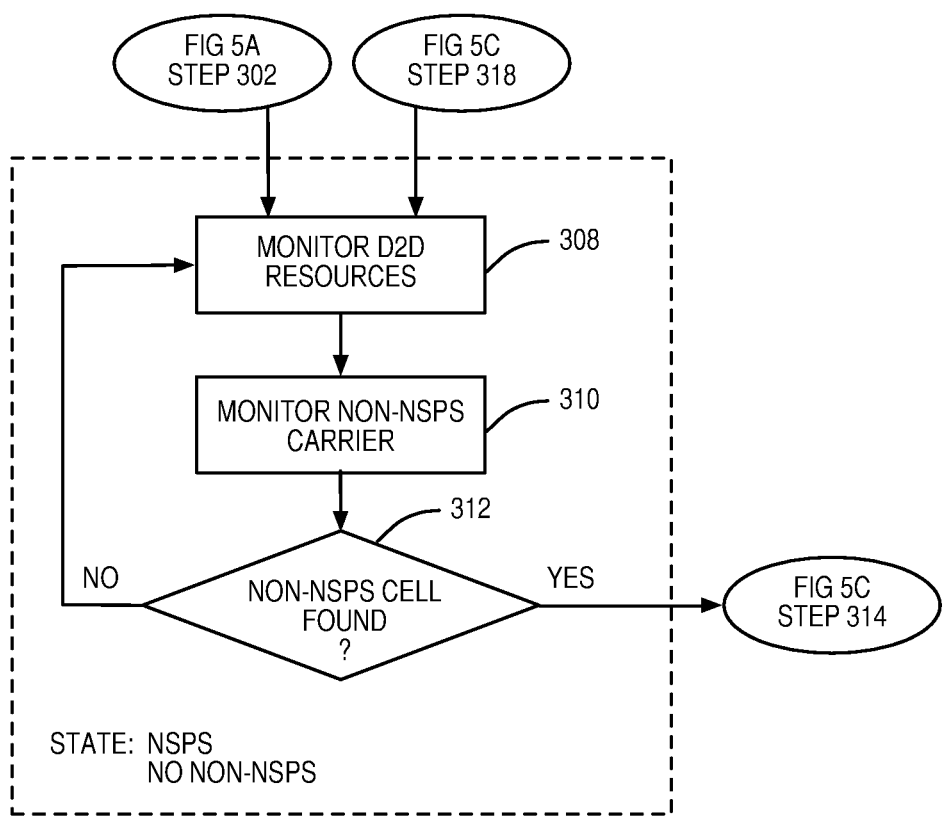
Figure 5C:
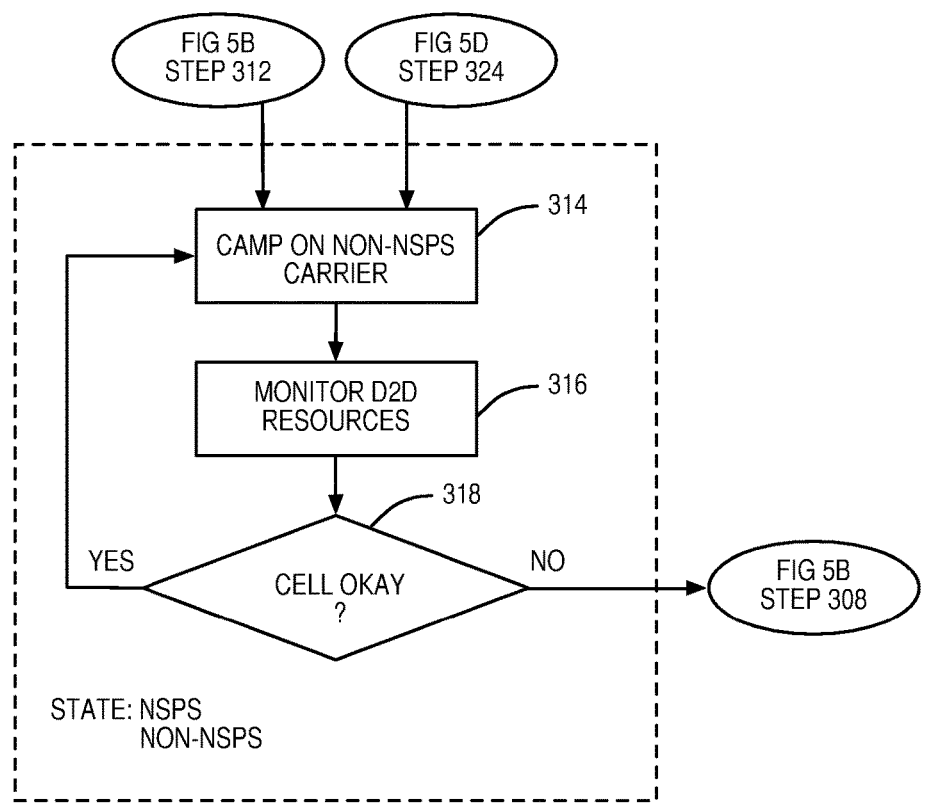
Figure 5D:
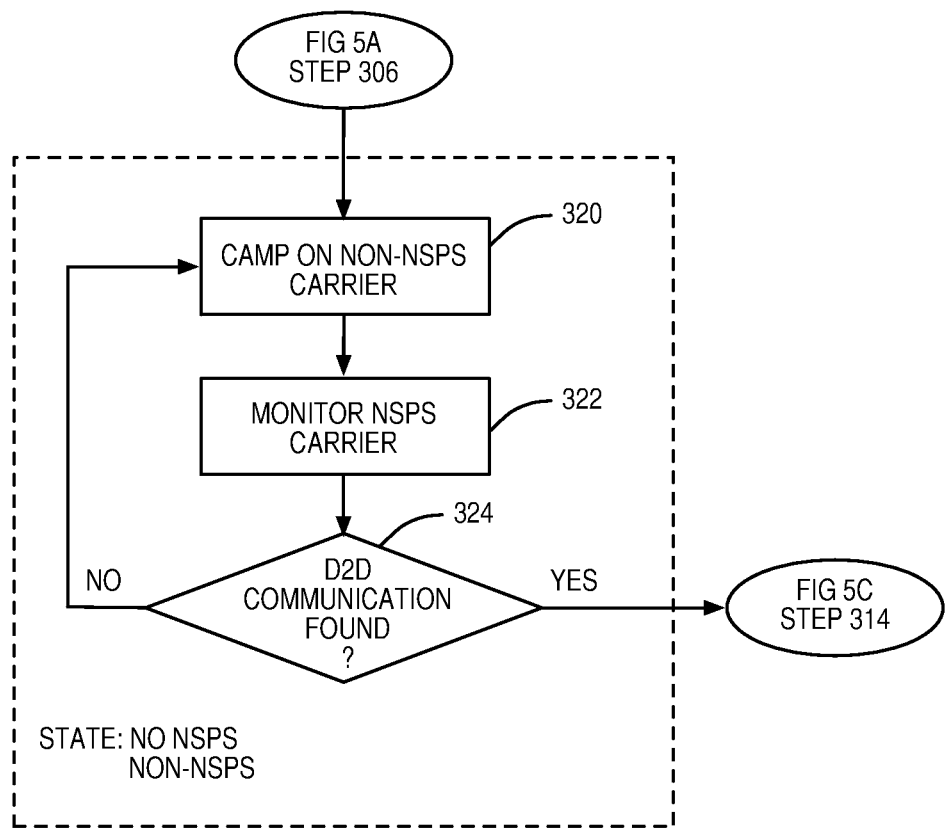

FIGS. 5A-5D illustrate some embodiments when NSPS camping/registration is not possible, based on four main states:
- in FIG. 5A, the UE 14 has no NSPS connection and no non-NSPS connection;
- in FIG. 5B, the UE 14 has detected D2D communication but has no non-NSPS connection;
- in FIG. 5C, the UE 14 has both detected D2D communication and has a non-NSPS connection; and
- in FIG. 5D, the UE 14 has no NSPS connection but has a non-NSPS connection.

Some of these states can be facilitated if the UE 14 is capable of receiving broadcasts at multiple carriers simultaneously (e.g., if the device has carrier aggregation possibilities). Otherwise, the UE 14 can use idle periods in the D2D broadcast to scan/monitor non-NSPS carriers or use idle periods in non-NSPS broadcasts (i.e., during non-paging occasions) to scan/monitor NSPS carriers. Yet another alternative is that the UE 14 creates autonomous gaps to enable monitoring of the prioritized service, and monitoring of the less prioritized service will be best-effort.

Starting in FIG. 5A, the UE 14 is not aware of D2D communication or non-NSPS broadcasts. The UE 14 starts monitoring one or more NSPS carriers (step 300). If no D2D broadcasts are detected (step 302), the UE 14 moves on to monitor non-NSPS carriers (step 304). If no non-NSPS carriers are detected (step 306), then the UE 14 returns to step 300 and continues to monitor an NSPS carrier. Capable UEs may perform steps 300 and 304 simultaneously.

If D2D communication has been detected (step 302), the UE 14 will transition to a different state and to step 308 in FIG. 5B. Similarly, if a non-NSPS cell is found (step 306), the UE 14 will transition to a different state and to step 320 in FIG. 5D.

In FIG. 5B, the UE 14 is aware of D2D communication but not non-NSPS broadcasts. As such, the UE 14 monitors the D2D resources (step 308). Furthermore, the UE 14 will monitor non-NSPS carriers, possibly in consideration of the prioritization discussed below and possibly facilitated by capabilities that enable the UE 14 to monitor non-NSPS carriers while monitoring D2D broadcasts simultaneously (step 310). Optionally, the UE 14 may consider less frequent non-NSPS monitoring when monitoring D2D resources. The monitoring frequency can also change over time (e.g., become gradually less frequent). The monitoring frequency can also be adapted by higher layers in UE 14, for example triggered by information received over D2D resources. Such information could, for example, be signaled from a higher priority NSPS UE, CH, or a D2D control plane relay (an in-coverage UE that forwards information and its camping cell/network).

If a non-NSPS cell is not found, the UE 14 returns to step 308 and monitors D2D resources. If the UE 14 does detect a non-NSPS cell (step 312), the UE 14 will transition to a different state and to step 314 in FIG. 5C.

In FIG. 5C, the UE 14 is aware of D2D communication and non-NSPS broadcasts. The UE 14 camps (and registers if needed) on the non-NSPS cell (step 314). The UE 14 then monitors the D2D resources (step 316). The monitoring of the D2D resources and the NSPS broadcast/paging will be in consideration of the prioritization discussed below, possibly facilitated by capabilities that enable the UE 14 to monitor non-NSPS broadcasts/paging while monitoring D2D broadcasts simultaneously. Ordinary cell reselection mechanisms apply, which means that the UE 14 may search for and camp on (and register if needed) a different non-NSPS carrier cell if necessary. As long as the UE 14 determines that the non-NSPS cell is okay (e.g., suitable), the UE 14 returns to step 314 and continues to camp on the non-NSPS cell. If the UE 14 determines that the non-NSPS cell is not okay and can no longer monitor any non-NSPS cell (step 318), the UE 14 will transition to a different state and to step 308 in FIG. 5B. The UE 14 will continue to operate as described above.

In FIG. 5D, the UE 14 is not aware of D2D communication but is aware of non-NSPS broadcasts. The UE 14 camps (and registers if needed) on the non-NSPS cell (step 320). The UE 14 then starts monitoring one or more NSPS carriers (step 322). The monitoring of the NSPS carriers and the monitoring of non-NSPS broadcast/paging will be in consideration of the prioritization discussed below, possibly facilitated by capabilities that enable the UE 14 to monitor non-NSPS broadcasts/paging while monitoring NSPS carriers simultaneously. Optionally, the non-NSPS registration may be different when the UE is monitoring D2D resources, or is NSPS capable, compared to regular non-NSPS registration, as described above.

If no D2D communication is found (step 324), the UE 14 returns to step 320 and continues to camp on the non-NSPS cell. If D2D communication is found, the UE 14 will transition to a different state and to step 314 in FIG. 5C. The UE 14 will continue to operate as described above.

At least some embodiments disclosed herein solve the problem with cell reselection and D2D monitoring between non-NSPS and NSPS carriers. Hence, NSPS devices may monitor for D2D communication on an NSPS carrier while camping on a non-NSPS RAT.

Figure 6:
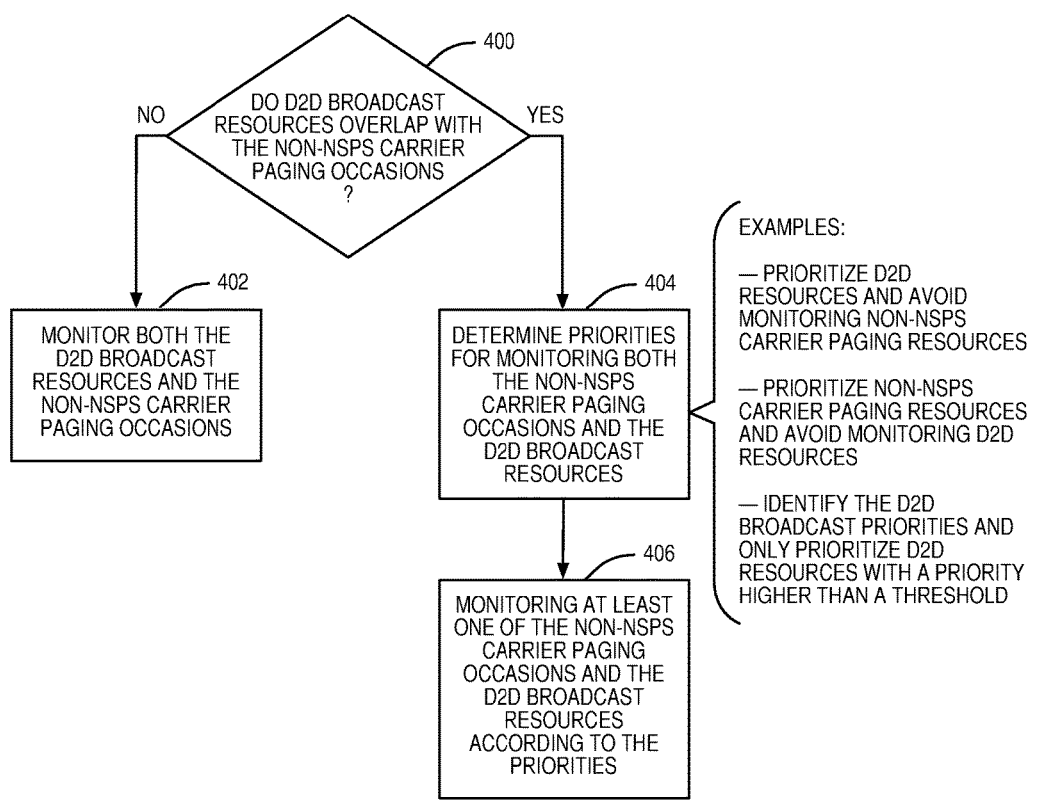
FIG. 6 illustrates a method of operating a wireless device for monitoring multiple broadcasts, according to some embodiments of the present disclosure.

As discussed above, in some states, the UE 14 has both D2D broadcast resources and non-NSPS carrier paging occasions available to monitor. In some embodiments, this requires a prioritization. FIG. 6 illustrates a method of operating the UE 14 for monitoring multiple broadcasts, according to some embodiments of the present disclosure.

First, it is determined if the D2D broadcast resources overlap with the non-NSPS carrier paging occasions (step 400). If the two do not overlap, the UE 14 can monitor both the D2D broadcast resources and the non-NSPS carrier paging occasions (step 402). If the two do overlap, priorities must be determined for monitoring both the non-NSPS carrier paging occasions and the D2D broadcast resources (step 404). For example, the UE 14 may either:

prioritize D2D resources and avoid monitoring non-NSPS carrier paging resources when overlapping with D2D broadcast resources;

prioritize non-NSPS carrier paging resources and avoid monitoring D2D resources when overlapping with D2D broadcast resources; or identify the D2D broadcast priorities and only prioritize D2D resources with a priority higher than a threshold.

Next, the UE 14 monitors at least one of the non-NSPS carrier paging occasions and the D2D broadcast resources according to the priorities determined (step 406).

Figure 7:
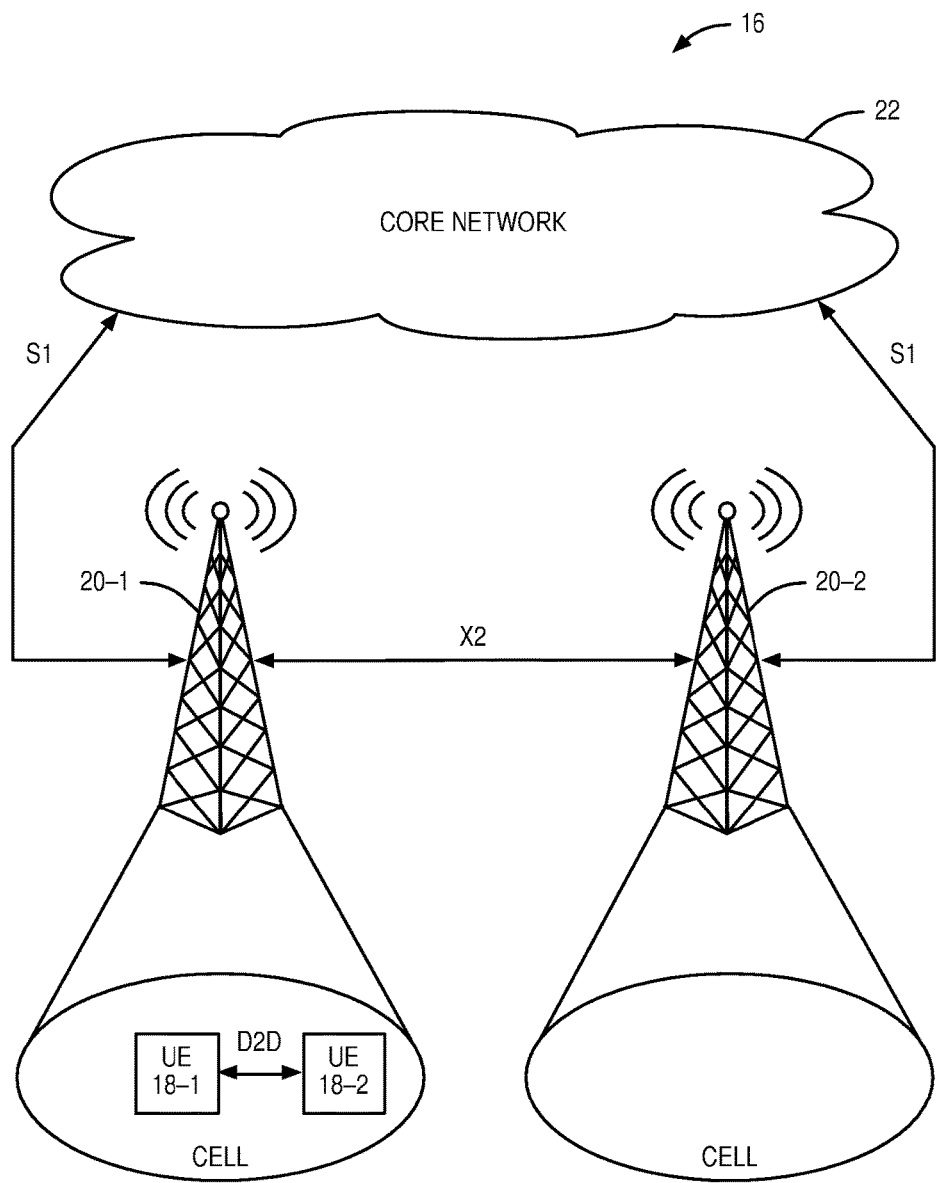
FIG. 7 illustrates an exemplary Long Term Evolution (LTE) network.

Although the described solutions may be implemented in any appropriate type of telecommunication system supporting any suitable communication standards and using any suitable components, particular embodiments of the described solutions may be implemented in an LTE network, such as that illustrated in FIG. 7. As shown in FIG. 5, the example network 16 may include one or more instances of wireless communication devices (e.g., conventional UEs, MTC devices, etc.) 18-1 and 18-2 and one or more radio access nodes (e.g., eNBs or other base stations) 20-1 and 20-2 capable of communicating with these wireless communication devices 18-1 and 18-2 along with any additional elements suitable to support communication between wireless communication devices or between a wireless communication device and another communication device (such as a landline telephone). FIG. 7 also shows a core network 22. Communication between the one or more radio access nodes 20-1 and 20-2 is accomplished by X2 communication. Communication between the one or more radio access nodes 20-1 and 20-2 and the core network 22 is accomplished by S1 communication.

Figure 8:
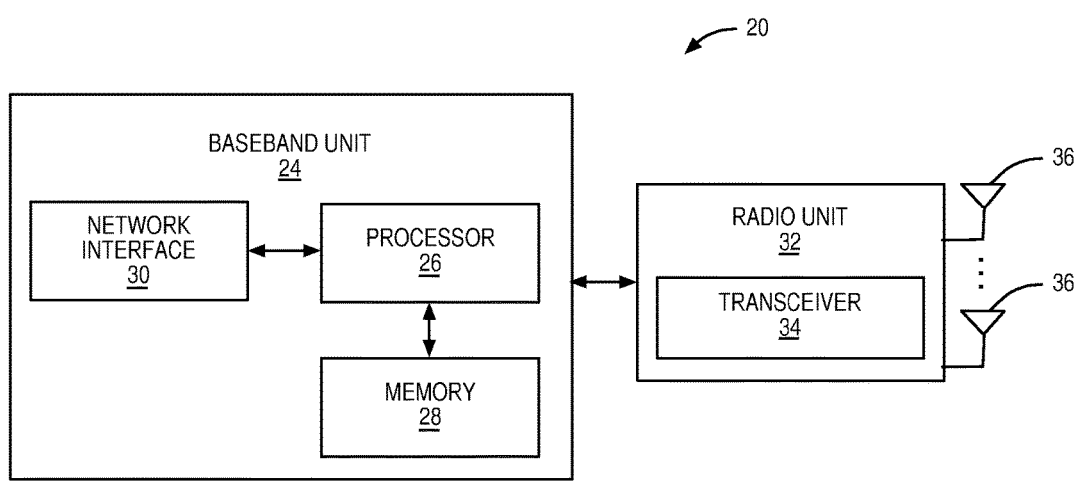
FIG. 8 illustrates a network node, according to some embodiments of the present disclosure.
Figure 9:
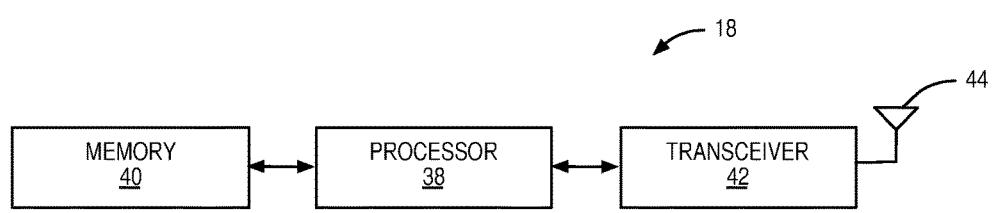
FIG. 9 illustrates a wireless communication device, according to some embodiments of the present disclosure.

Although the illustrated wireless communication devices 18-1 and 18-2 may represent communication devices that include any suitable combination of hardware and/or software, these wireless communication devices 18-1 and 18-2 may, in particular embodiments, represent devices such as the example wireless communication device 18 illustrated in greater detail by FIG. 9. Similarly, although the illustrated radio access node 20 may represent network nodes that include any suitable combination of hardware and/or software, these nodes may, in particular embodiments, represent devices such as the example radio access node 20 illustrated in greater detail by FIG. 8.

FIG. 8 is a block diagram of a radio access node 20 according to some embodiments of the present disclosure. As illustrated, the radio access node 20 includes a baseband unit 24 with a processor 26, memory 28, and a network interface 30. As illustrated, the radio access node 20 also includes a radio unit 32 with a transceiver 34 and one or more antennas 36. In some embodiments, the radio access node 20, or the functionality of the radio access node 20 described with respect to any one of the embodiments described herein, is implemented in software that is stored in, e.g., the memory 28 and executed by the processor 26. The network interface 30 may include one or more components (e.g., network interface card(s)) that connect the radio access node 20 to other systems. Alternative embodiments of the radio access node 20 may include additional components responsible for providing additional functionality, including any of the functionality identified above and/or any functionality necessary to support the solution described above.

In some embodiments, a computer program including instructions which, when executed by at least one processor, causes the at least one processor to carry out the functionality of the radio access node 20 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 28).

FIG. 9 is a block diagram of a wireless communication device 18 according to some embodiments of the present disclosure. As illustrated, the wireless communication device 18 includes a processor 38, memory 40, a transceiver 42, and at least one antenna 44. In some embodiments, wireless communication device 18, or the functionality of the wireless communication device 18 described with respect to any one of the embodiments described herein, is implemented in software that is stored in, e.g., the memory 40 and executed by the processor 38. The transceiver 42 uses the at least one antenna 44 to transmit and receive signals and may include one or more components that connect the wireless communication device 18 to other systems. Alternative embodiments of the wireless communication device 18 may include additional components beyond those shown in FIG. 9 that may be responsible for providing certain aspects of the device's functionality, including any of the functionality described above and/or any functionality necessary to support the solution described above.

In some embodiments, a computer program including instructions which, when executed by at least one processor, causes the at least one processor to carry out the functionality of the wireless communication device 18 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 40).

Figure 10:
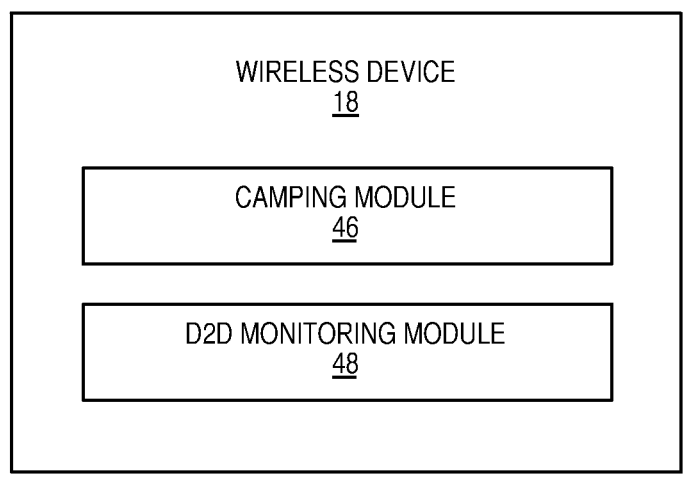
FIG. 10 illustrates a wireless communication device, according to some embodiments of the present disclosure.

FIG. 10 is a block diagram of wireless communication device 18 according to some embodiments of the present disclosure. As illustrated, the wireless communication device 18 includes a camping module 46 and a D2D monitoring module 48 that are each implemented in software that, when executed by a processor of the wireless communication device 18, causes the wireless communication device 18 to operate according to one of the embodiments described herein. The camping module 46 operates to camp on a cell or CH that does not support D2D communication, as described above with respect to camping steps 100, 210, 314, and 320. The D2D monitoring module 48 operates to monitor at least one second carrier on a set of pre-configured radio resources as discussed above with respect to, for example, steps 102, 212, 300, 308, 316, and 322.

Systems and methods for RAT selection for devices capable of D2D communication are disclosed herein. In one embodiment, a method of operation of a wireless communication device includes:

camping on a first cell on a first carrier, where the first cell does not support D2D communication; and while the first cell satisfies one or more criteria for the wireless communication device to remain camped on the first cell:

monitoring at least one second carrier on a set of pre-configured radio resources during a first time interval for at least one of a group consisting of: a second cell that supports D2D communication, a CH that supports D2D communication, and D2D communication outside of network coverage for the D2D communication.

Further, in one embodiment, monitoring the at least one second carrier includes monitoring the at least one second carrier for at least one of a second cell that supports D2D communication and a CH that supports D2D communication. In one embodiment, if the wireless communication device detects a second cell that supports D2D communication, the wireless communication device camps on the second cell. In another embodiment, if the wireless communication device detects a CH that supports D2D communication, the wireless communication device camps on the CH.

In another embodiment, monitoring the at least one second carrier includes monitoring the at least one second carrier for D2D communication outside of network coverage for the D2D communication. Further, in one embodiment, if the wireless communication device detects D2D communication, the wireless device continues to monitor one or more of the at least one second carrier for D2D communication. In another embodiment, the wireless device determines whether radio resources on which the D2D communication is detected overlap with radio resources utilized for paging occasions on the first carrier. If there is no overlap, the wireless communication device continues to monitor both the first carrier and one or more of the at least one second carriers on which the D2D communication was detected. If there is an overlap, then, in one embodiment, the wireless communication device prioritizes monitoring for the D2D communication. In another embodiment, the wireless device prioritizes monitoring of radio resources utilized on the first carrier for paging occasions. In yet another embodiment, the wireless communication device identifies a priority of the D2D communication and prioritizes monitoring for the D2D communication if the priority is greater than a threshold.

In one embodiment, the set of pre-configured radio resources are received from the first cell. In another embodiment, the set of pre-configured radio resources are pre-configured in the wireless communication device.

In one embodiment, the first time interval is during a non-paging occasion of the first cell on the first carrier. In another embodiment, the first time interval is the entire non-paging occasion minus synchronization time needed.

In one embodiment, monitoring the set of pre-configured radio resources includes detecting one of the at least one second carriers upon successfully synchronizing to the one of the at least one second carriers. In another embodiment, monitoring the set of pre-configured radio resources includes detecting one of the at least one second carriers upon successfully reading system information (e.g., MIB and/or SIB information). In another embodiment, monitoring the set of pre-configured radio resources includes detecting one of the at least one second carriers upon receiving a random access response from the corresponding cell or CH.

In one embodiment, monitoring the set of pre-configured radio resources includes monitoring at least radio resources allocated for D2D synchronization signals. Further, upon detecting the D2D synchronization signals, monitoring further includes monitoring resources allocated for D2D beacon signals and/or D2D broadcast transmissions.

In all of the example embodiments above, in one embodiment, the first carrier is a non-NSPS carrier and the second carrier is an NSPS carrier.

The following acronyms are used throughout this disclosure.

2G $2^{nd}$ Generation
3G $3^{rd}$ Generation
3GPP $3^{rd}$ Generation Partnership Project
4G $4^{th}$ Generation
5G $5^{th}$ Generation
CH Cluster Head
D2D Device-to-Device
DRX Discontinuous Reception
EDGE Enhanced Data Rates for Global Evolution
eNB evolved Node B
FDD Frequency Division Duplexing
GSM Global System for Mobile Communications
HSPA High Speed Packet Access
IRAT Inter-RAT
LTE Long Term Evolution
MIB Master Information Block
ms milliseconds
MTC Machine-Type Communication
NSPS National Security Public Safety
PRB Physical Resource Block
PSS Primary Synchronization Signal
RAT Radio Access Technology
RSRP Reference Signal Receive Power
RSRQ Reference Signal Received Quality
RSSI Received Signal Strength Indicator
SIB System Information Block
SIM Subscriber Identity Module
SINR Signal-to-Interference-and-Noise Ratio
SSS Secondary Synchronization Signal
TDD Time Division Duplexing
TR Technical Report
UE User Equipment
WCDMA Wideband Code Division Multiple Access
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a cellular communications network, the method comprising:

camping on a first cell on a first carrier, wherein the first cell does not support device-to-device (D2D) communication;

during a first time interval when the first cell satisfies one or more criteria for the wireless device to remain camped on the first cell, monitoring at least one second carrier on a set of pre-configured radio resources for at least one of the group consisting of: a second cell that supports D2D communication, a signal from a second wireless device that supports D2D communication, and D2D communication, wherein monitoring the at least one second carrier comprises monitoring at least one second carrier on the set of pre-configured radio resources for D2D communication;

determining whether the D2D communication is detected on the at least one second carrier based on the monitoring of the at least one second carrier;

if the D2D communication is detected on one of the at least one second carrier that supports the D2D communication:

remaining camped on the first cell on the first carrier; and monitoring the at least one second carrier on the set of pre-configured radio resources for the D2D communication;

determining whether radio resources on which the D2D communication is detected overlap with radio resources utilized for paging occasions on the first carrier; and if the radio resources on which the D2D communication is detected do overlap with the radio resources utilized for paging occasions on the first carrier:

determining priorities for monitoring both the first carrier and one or more of the at least one second carrier on which the D2D communication is detected; and monitoring at least one of the first carrier and the one or more of the at least one second carrier according to the priorities, wherein determining the priorities for monitoring comprises prioritizing monitoring of the one or more of the at least one second carrier on which the D2D communication is detected if a priority value for D2D communication is greater than a threshold value and prioritizing monitoring of the radio resources utilized for paging occasions on the first carrier if the priority value for D2D communication is not greater than the threshold value.

* * * * *